United States Patent [19]
Fujii et al.

[11] Patent Number: 5,273,811
[45] Date of Patent: Dec. 28, 1993

[54] STRETCHED, LAMINATED FILM

[75] Inventors: Toshio Fujii; Toyomitsu Kondo; Kazuhiro Kato, all of Kurashiki, Japan

[73] Assignee: Mitsubishi Kasei Corporation, Tokyo, Japan

[21] Appl. No.: 911,660

[22] Filed: Jul. 13, 1992

[30] Foreign Application Priority Data

Jul. 24, 1991 [JP] Japan .................. 3-184860

[51] Int. Cl.$^5$ .............. B32B 27/08; B32B 27/32; C08L 23/10
[52] U.S. Cl. .................. 428/215; 428/220; 428/483; 428/516; 428/349; 264/176.1
[58] Field of Search ............. 428/516, 910, 483, 216, 428/220

[56] References Cited

U.S. PATENT DOCUMENTS

| | | | |
|---|---|---|---|
| 2,876,187 | 3/1959 | Wolinski | 204/158 |
| 4,230,767 | 10/1980 | Isaka et al. | 428/349 |
| 4,612,221 | 9/1986 | Biel et al. | 428/35 |
| 4,629,657 | 12/1986 | Gulati et al. | 428/461 |

FOREIGN PATENT DOCUMENTS

| | | |
|---|---|---|
| 0204324 | 12/1986 | European Pat. Off. . |
| 2405972 | 5/1979 | France . |
| 1117354 | 6/1968 | United Kingdom . |

OTHER PUBLICATIONS

Database WPIL, Derwent Publications Ltd., London, GB; & JP-A-4 211 922 (Mitsubishi Kasei Corp.) *abstract*.

*Primary Examiner*—P. C. Sluby
*Attorney, Agent, or Firm*—Nixon & Vanderhye

[57] ABSTRACT

Disclosed herein is a stretched, laminated film comprising at least an outer layer, an intermediate layer and an inner layer, said outer layer and inner layer comprising a polypropylenes composition composed of 100 parts by weight of polypropylenes (A), 2 to 30 parts by weight of polybutene and/or polyisobutylene (B) and 0.2 to 5 parts by weight of a polyglycerin fatty acid ester (C), and said intermediate layer comprising polyesters (D).

10 Claims, No Drawings

STRETCHED, LAMINATED FILM

BACKGROUND OF THE INVENTION

The present invention relates to a stretched, laminated film. More particularly, the present invention relates to a stretched, laminated film suitable as a wrapping film which is excellent in cuttability, transparency, heat-resistance, adherence, gas-barrier properties, anti-heat-shrinkage, and food safety.

As conventionally known packaging film (wrapping film) used for the purpose of packaging articles, for example, foodstuffs, etc., a film composed of polyvinylidene chloride, polyethylene or polyvinyl chloride as the main constituent can be exemplified. These wrapping films when used to package articles are often charged into an electronic oven to be heated, so that they must not only have good adherence but also be prevented from heat-shrinkage, melting, color change and the like when heated to a high temperature, in other words, to have a excellent heat resistance.

However, a polyvinylidene chloride film is disadvantageous in that the heat-shrinkage is large. A polyethylene film has a defect in that the film melts when it comes into contact with a hot oily substance such as hot meat and fried food. A polyvinyl chloride film whitens when it contacts boiling water.

As resins for a packaging film having heat-resistance, polyesters such as a polyethylene terephthalate (hereinunder referred to as "PET") are known. PET has both excellent heat-resistance and excellent mechanical strength, but it is difficult to impart adherence to PET. It is, therefore, difficult to use PET as a wrapping film in the form of a single-layer film. A wrapping film is required to have excellent cuttability. A wrapping film is generally sold and used in a case such as paper box from which the film is drawn out to the required length and cut off by bringing the film into contact with a cutting blade or "a cutting edge" which is attached to the case. As the "cutting edge" used for cutting off the film, a simple blade produced merely by blanking an iron plate of about 0.2 mm in thickness into the shape of a saw is generally used. The case holding the "cutting edge" is generally a paper box made of coated board having a strength of about 350 to 700 g/m$^2$, so that the rigidity thereof is very low.

This type of film may be easy to cut by such a simple cutting mechanism as desired by the user. However actually, not only the case or the "cutting edge" is sometimes deformed but also the film is sometimes deformed or cut at a position other than perpendicular to the "cutting edge" more specifically, at the time of cutting, when a rift occurs on a conventional polyvinylidene film, the film has a tendency of being cut obliquely along the rift instead of along the "cutting edge". A conventional polyethylene film requires a considerable pulling force at the time of cutting, so that the case is sometimes bent and the film is sometimes deformed. Furthermore, a wrapping film which does not generate chlorine or the like during use or when burned, has recently been demanded for environmental reasons.

A packaging film comprising an inner layer and an outer layer composed of polypropylene composition, and an intermediate layer composed of an aliphatic polyamides was proposed as a wrapping film which generates no chlorine (Japanese Patent Application Laid-Open (KOKAI) Nos. 2-1605, 3-13550, 3-15547, and 3-283346).

In spite of these films, a laminated film composed of a chlorine-free resin polymer, and which has improved heat-resistance, adherence, gas-barrier property and easy cutting property is required.

It has been found that by stretching a laminate comprising a polyester such as a PET resin as an intermediate layer and a polypropylene composition as an outer layer and an inner layer composed of 100 parts by weight of polypropylene, 2 to 30 parts by weight of polybutene and/or polyisobutylene and 0.2 to 5 parts by weight of a polyglycerin fatty acid ester, the resultant stretched, laminated film has excellent cuttability, transparency, heat-resistance, adherence, gas-barrier property, anti-heat shrinkability and food safety, especially excellent heat-resistance and cuttability without impairing the intrinsic properties (heat-resistance and mechanical strength) of the polyester resin, and further is free of chlorine. The present invention has been achieved on the basis of this finding.

SUMMARY OF THE INVENTION

In one aspect of the present invention, there is provided a stretched, laminated film comprising at least an outer layer, an intermediate layer and an inner layer, the outer layer and inner layer comprising a polypropylene resin composition composed of 100 parts by weight of polypropylene (A), 2 to 30 parts by weight of polybutene and/or polyisobutylene (B) and 0.2 to 5 parts by weight of a polyglycerin fatty acid ester (C), and the intermediate layer comprising polyester resin (D); and having the shear peel strength of the outer layer and the inner layer of not less than 0.4 kg/cm$^2$, and the 180° peel strength thereof of not more than 4 g/50 mm, the tensile break elongation in the machine direction (=direction parallel to the direction of drawing) of not more than 200%, the ratio of the tensile break elongation in the machine direction (=direction parallel to the direction of drawing) and that in the transverse direction (=direction vertical to the direction of drawing) of not more than 3, the thickness of not more than 40 $\mu$m, and the thickness of the intermediate layer of 10 to 90% of the total film thickness.

DESCRIPTION OF THE PREFERRED EMBODIMENTS

In the polypropylene resin composition in the present invention, a larger amount of polypropylene (A) than either of the polybutene and/or polyisobutylene (B) component and the polyglycerin fatty acid ester (C) component is contained; the polypropylene (A) is used as the base material of the composition.

As the polypropylene (A), for example, a propylene homopolymer and a copolymer of propylene and a small amount of another comonomer such as ethylene and butene are usable. Examples of propylene homopolymer are an isotactic polypropylene, a syndiotactic polypropylene and an atactic polypropylene. Among these, isotactic polypropylene is preferable. As the copolymer of propylene and another comonomer such as ethylene and butene (content: 0.5 to 7 wt %), a random copolymer and a block copolymer are both usable, but a propylene-ethylene random copolymer containing 1 to 5 wt % of ethylene is preferable. The physical properties of the polypropylenes (A) may be appropriately selected in accordance with the purposes of use and conditions, but the polypropylenes (A) having a melt flow rate (MFR) of 0.5 to 20 g/10 min (measured at a temperature of 230° C. and with a load of 2.16 kg in accordance with JIS K 6758), more preferably 3 to 15 g/10 min, a density of 0.89 to 0.91 g/cm$^3$, more preferably 0.893 to 0.905 g/cm$^3$ are preferable.

The polybutene and/or polyisobutylene (B) in the polypropylene composition acts as an adhesion component imparting excellent adherence to the film produced. The physical properties of the polybutene and/or polyisobutylene (B) are not specified and may be appropriately selected in accordance with the amount, the kind of another copolymer component, and end uses of the intended composition. It is generally preferable that the polybutene and/or polyisobutylene (B) have a number-average molecular weight of 200 to 3,000, more preferably 400 to 2,000, and a viscosity of 300 to 50,000 cps, more preferably 500 to 15,000. The amount of polybutene and/or polyisobutylene (B) is 2 to 30 parts by weight, preferably 5 to 25 parts by weight based on 100 parts by weight of the polypropylene (A). If the amount of polybutene and/or polyisobutylene (B) is less than 2 parts by weight, it is difficult to impart sufficient adherence to the film. On the other hand, if the amount exceeds 30 parts by weight, stickiness is caused by a large amount of bleeding, and the heat-resistance is lowered.

The polyglycerin fatty acid ester (C) in the polypropylene composition used together with the polybutene and/or polyisobutylene (B) increases the adherence of the film. The polyglycerin fatty acid ester (C) is a compound obtained by esterifying at least one hydroxyl group of a glycerin condensation with a higher fatty acid having 8 to 22 carbon atoms. The polymerization degree of the glycerin condensation is generally 2 to 10, preferably 2 to 6, more preferably 2 to 3. The number of hydroxyl groups of the glycerin condensation which are esterified is at least one, preferably at least one and not more than 70% based on the total number of hydroxyl groups, more preferably at least one and not more than 60% based on the total number of hydroxyl groups. The higher fatty acid may be either saturated or unsaturated fatty acid having 8 to 22 carbon atoms. A higher fatty acid having 10 to 18 carbon atoms is particularly preferable. As examples of the polyglycerin fatty acid ester (C), diglycerin monolaurate, diglycerin monopalmitate, diglycerin monooleate, diglycerin monostearate, diglycerin dioleate and triglycerin monooleate may be exemplified. Among these, diglycerin monooleate and diglycerin monolaurate are preferable.

Two or more of these polyglycerin fatty acid esters (C) may be jointly used. The amount of polyglycerin fatty acid ester (C) used is 0.2 to 5 parts by weight, preferably 0.5 to 3 parts by weight based on 100 parts by weight of the polypropylene (A). If the amount of polyglycerin fatty acid ester (C) is less than 0.2 parts by weight, it si difficult to produce a synergistic effect of the polypropylene (A) and the polyglycerin fatty acid ester (C). On the other hand, if the amount exceeds 5 parts by weight, stickiness and odor are caused by a large amount of bleeding and a large amount of gel unfavorably tends to be produced.

The polyester (D) constituting the intermediate layer of the wrapping film of the present invention is a thermoplastic polyester obtained by the polycondensation of a dibasic acid and a divalent alcohol. For example, a saturated polyester produced from terephthalic acid or a derivative thereof and ethylene glycol is preferable.

As the terephthalic acid derivative as the main acid component of the polyester (D), a lower alkyl ($C_1$–$C_8$) ester of terephthalic acid is preferable. An alkyl ester having 1 to 4 carbon atoms, particularly, dimethyl terephthalate is preferable.

In the present invention, a part (generally 2 to 20 wt %) of the acid component may be replaced by another acid component such as dicarboxylic acid or oxycarboxylic acid other than terephthalic acid, for example, isophthalic acid, phthalic acid, 2,6-naphthalenedicarboxylic acid, parahydroxyethoxybenzoic acid, adipic acid, sebacic acid, and a lower alkyl ($C_1$–$C_8$) ester thereof.

The main glycol component of the polyester (D) in the present invention is ethylene glycol. A part (generally 2 to 20 wt %) of the ethylene glycol may be replaced by another glycol component such as trimethylene glycol, tetramethylene glycol, hexamethylene glycol, neopentyl glycol and 1,4-cyclohexanedimethanol.

In any case, the polyester (D) in the present invention refers to a polyester containing ethylene terephthalate units as the main component, for example, not less than 80 mol % based on all the components.

As the polyester (D) in the present invention, polyethylene terephthalate (PET) composed of about 50 mol % of terephthalic acid and about 50 mol % of ethylene glycol, and having a viscosity-average molecular weight of 10,000 to 30,000, preferably 17,000 to 22,000 is particularly preferable because it has excellent transparency and film-forming properties, and good heat-resistance which are required of a wrapping film.

The appropriate intrinsic viscosity [$\eta$] of the polyester (D) of the present invention is 0.4 to 1.0, preferably 0.5 to 0.8 from the view-point of the film-forming property.

The wrapping film of the present invention is produced by forming an unstretched, laminated film composed of the polypropylene composition as the outer and inner layers and the polyester (D) as the intermediate layer by any conventional lamination method, and stretching the resultant unstretched, laminated film.

As examples of the lamination method include a heat-bonding lamination method, an extrusion lamination method, a dry lamination method and a coextrusion method. Among these, a coextrusion method is particularly preferable.

As the coextrusion method, a T-die extrusion method and an air-cooling or water-cooling inflation method may be adopted. Among these, a T-die extrusion method and a water-cooling inflation method are preferable. By quenching the melt-extruded resin by either of these methods, it is possible to obtain a film having an excellent transparency.

The unstretched, laminated film is formed so that the outer layer and the inner layer have a thickness of 10 to 200 $\mu$m, preferably 20 to 100 $\mu$m, and the intermediate layer has a thickness of 5 to 200 $\mu$m, preferably 10 to 50 $\mu$m. An adhesive layer may be disposed between the intermediate layer and the inner layer and/or between the intermediate layer and the outer layer, and the thickness of the adhesive layer is 2 to 4 $\mu$m, preferably 4 to 20 $\mu$m.

The unstretched, laminated film obtained by coextrusion is stretched in at least one direction, namely, either in the machine direction (parallel to the direction of film drawing) or in the transverse direction (vertical to the direction of film drawing) or both direction. The film is uniaxially or biaxially stretched at a stretch ratio of 2 to 6 times, preferably 3 to 5 times in each direction. In the case of unaxial stretching, the film is preferably stretched in the machine direction by the above described stretch ratio. If the stretch ratio is less than 2, cuttability of the stretched film tends to be lowered. If the stretch ratio is more than 6, stretching properties of the film tend to be lowered and rapture and unevenness of stretching are apt to be generated. The stretching operation is carried out, for example, by heating the unstretched film as it is or after it is slit to a predetermined width, stretching the heated film in the machine direction by, for example, changing the peripheral speed of stretch rolls, and then stretching the resultant film in the transverse direction by a tentering stretching method. The preheating temperature for the stretching process is in the range of 50° C. to 10° C. below the melting point of the polypropylene (A) preferably in the range of 70° to 140° C.

The heat-setting temperature after stretching the film is a temperature higher than the preheating temperature. In order to prevent the film from wrinkling and shrinking at a high temperature, the film is preferably heat-set at as high a temperature as possible. The heat-setting process is carried out at a temperature in the range of the preheating temperature to 10° C. below the melting point of the polypropylene (A) preferably in the range of 80° to 150° C.

If the preheating temperature or the heat-setting temperature is over a temperature of about 10° C. lower than the melting point of the polypropylene (A), the film easily adheres to the stretch rolls. On the other hand, if the preheating temperature is lower than 50° C., the PET tends to become difficult to stretch due to insufficient heat, thereby tending to cause a rupture.

The thickness of the packaging film of the present invention is not more than 40 μm, preferably 2 to 30 μm, more preferably 5 to 20 μm. The thickness of the intermediate layer is 10 to 90%, preferably 15 to 80%, more preferably 20 to 40% based on the total thickness. If the film thickness is larger than 40 μm, the tear strength of the film, when the film is cut, becomes too large for a wrapping film.

If the thickness of the intermediate layer is less than 10% based on the total thickness, it is difficult to maintain the intrinsic heat-resistance and mechanical strength of PET. The intermediate film, preferably, has a thickness of not less than 15% based on the total film thickness. On the other hand, if the thickness of the intermediate film is larger than 90% based on the total thickness, the polypropylene layer becomes so thin that it is difficult to film-form the intermediate layer uniformly by coextrusion. In addition, it is disadvantageous from the view-point of cost. The intermediate layer preferably has a thickness of not more than 80% based on the total thickness.

The stretched, laminated film of the present invention is composed of at least three resin layers, namely, outer layer/intermediate layer/inner layer. The stretched, laminated film of the present invention may have four or more resin layers within the spirit of the invention. For example, the film may have a structure of outer layer/adhesive layer/intermediate layer/inner layer, outer layer/intermediate layer/adhesive layer/inner layer, or outer layer/adhesive layer/intermediate layer/adhesive layer/inner layer.

In the present invention, a five-layered film composed of three kinds of resins having an adhesive layer of a modified polyolefin between the outer layer and the intermediate layer, and between the inner layer and the intermediate layer is especially preferable, because it does not impair the transparency and the film-forming property as a wrapping film. As examples of the modified polyolefin, a polyolefin such as polyethylene and polypropylene having a polar group of an unsaturated carboxylic acid such as anhydrous maleic acid or a derivative thereof added thereto by a graft reaction may be used. As a resin to be grafted, the polyester (D) used for the inner and outer layers is preferable in the point of adherence and the like.

The amount of modifying monomer of an unsaturated carboxylic acid, particularly, anhydrous maleic acid to be grafted is 0.01 to 10 parts by weight, preferably 0.01 to 3 parts by weight based on the parts by weight of the base resin to be grafted from the view-point of an adhesion with the polyester (D) as the intermediate layer.

It is preferable to dispose such an adhesive layer so as to have a thickness of 2 to 20%, preferably 3 to 10% based on the total thickness of the wrapping film.

Alternatively, by incorporating an appropriate adhesive component to each layer, it is possible to prevent each layer of a three-layer structure from peeling off without using a separate adhesive layer.

As examples of the adhesive component to be added to the outer layer, the intermediate layer and the inner layer (the amount of adhesive component to be added: 5 to 20 wt %), Novatec AP790P, AP792P, AP196P and AP197P (mfd. by Mitsubishi Kasei Corporation) may be exemplified.

The packaging film produced in the above-described manner has a shear peel strength of not less than 0.4 kg/cm$^2$, preferably 0.5 to 2.5 kg/cm$^2$, and a 180° peel strength of not more than 4 g/50 mm, preferably 1 to 3 g/50 mm. The tensile break elongation in the machine direction (parallel to the direction of drawing) is not more than 200%, preferably 5 to 150%, and the ratio of the tensile break elongation in the machine direction (parallel to the direction of drawing) and that in the transverse direction (vertical to the direction of drawing) is not more than 3, preferably 0.1 to 2.

The heat-resistant temperature of the wrapping film of the present invention is not lower than 200° C., preferably not lower than 210° C., and the percentage of heat-shrinkage at a temperature of 140° C. for 45 sec is not more than ±5%, preferably not more than ±3.5% both in the machine direction and in the transverse direction. The gas barrier property of the wrapping film of the present invention is not more than 500 cc/m$^2$·24 hr√atm.

These physical properties are obtained by the later-described measuring methods, and the shear peel strength and the 180° peel strength represent the adherence of the wrapping film of the present invention, and the tensile break elongation and the ratio of the tensile break elongation represent the cuttability.

The wrapping film of the present invention has excellent cuttability, transparency, heat-resistance, adherence, gas-barrier property, anti-heat shrinkage and food stability.

In addition, the wrapping film of the present invention is free from chlorine, so that it is also favorable from the view-point of the environmental problems.

EXAMPLES

The present invention will be explained in more detail hereinunder with reference to the following examples, but it is to be understood that the present invention is not restricted to these examples within the true spirit and scope of the invention.

The physical properties of the film obtained were measured by the following methods.

(1) TRANSPARENCY (HAZE VALUE)

The transparency of the film was measured by a haze meter in accordance with JIS K 6714. The haze value of the stretched, laminated film of the present invention of not more than 5, more preferably not more than 3 is preferred.

(2) HEAT-RESISTANT TEMPERATURE

Paper of 25 mm in length was applied to both the upper and lower ends of a test piece cut into a strip of 30 mm in width and 14 cm in length, and a weight of 10 g was hung from the test piece for 1 hour. The maximum ambient temperature at which the test piece was not broken, was read in the unit of ten degrees (See "Quality indication of wrapping film", the Tokyo-regulation No. 1072).

(3) PERCENTAGE OF HEAT-SHRINKAGE

The film was cut into a test piece 10 mm in diameter by a blanking jig, and the test piece was dipped in an aluminum pan containing silicone oil. The aluminum pan was placed on a hot plate heated to 140° C.. The temperature of the hot plate was temporarily lowered because the heat was transferred to the aluminum pan. The test piece is maintained at a temperature of 140° C. for 45 sec after the temperature of the hot plate rose again to 140° C., and then the test piece was taken out and a change in the size thereof was measured. The result is expressed in percentage.

(4) CUTTABILITY

The film was wound around a tubular core and placed in a wrapping film case. The film was cut with the cutting edge, and the cuttability was evaluated in four levels (good, normal, slightly bad, bad) on the assumption that the cuttability of a commercially available wrapping film was in the level of "normal". The wrapping film of the present invention is required to have a cuttability of "good".

(5) ADHESION STRENGTH

Two sheets of film were laid with one on top of the other. A roll of 25 mm and 150 mm in width was pressed against the film at a linear pressure of 0.3 kg/cm three times. Within 5 minutes thereafter, the forces required for shear peeling the two sheets of film and for peeling the two sheets of film in the direction of 180° were measured by an Instron-type tensile strength tester under the conditions shown in Table 1.

TABLE 1

|  | Shear peeling | 180° peeling |
| --- | --- | --- |
| Pulling speed | 300 mm/min | 300 mm/min |
| Chuck gap | 50 mm | 50 mm |
| Width of sample | 25 mm | 50 mm |
| Area for adhesion | 25 mm × 25 mm | 50 mm × 50 mm |
| Unit of measured value | kg/cm$^2$ | g/50 mm |

(6) TENSILE BREAK ELONGATION AND THE RATIO OF THE TENSILE BREAK ELONGATION

The tensile break elongations of the film in the machine direction (parallel to the direction of drawing) and the transverse direction (vertical to the direction of drawing) were measured in accordance with JIS C 2318. The ratio of the tensile break elongations in the machine direction and in the transverse direction was obtained from these values.

EXAMPLES 1 TO 4, COMPARATIVE EXAMPLES 1 TO 8

A propylene-ethylene random copolymer [Mitsubishi Polypro 6500J (trade mark), produced by Mitsubishi Kasei Corporation] (MFR: 9.0, density: 0.896, ethylene content: 2.5%) was used as the polypropylene (A), polybutene [Nissan Polybutene 015SH (trade name), produced by Nippon Oil and Fats Co., Ltd.) (average molecular weight: 580, viscosity: 2,000 cps at 25° C.) was used as the polybutene and/or polyisobutylene (B), and diglycerin monooleate (produced by Riken Vitamin Co., Ltd.) was used as the polyglycerin fatty acid ester (C). The amount of each component used is shown in Table 2, and these components were mixed by a blender and thereafter the resultant mixture was pelletized by a biaxial extruder having a diameter of 30 mm at a temperature of 220° C. to produce a polypropylene composition.

By using a three-type five-layer T-die coextruder having a width of 450 mm, the polypropylene composition was charged into an extruder No. 1 having a diameter of 50 mm, a polyethylene terephthalate having a viscosity-average molecular weight of 20,000 and an intrinsic viscosity [$\eta$] of 0.60 dl/g (produced by Mitsubishi Kasei Corporation) was charged into an extruder No. 2 having a diameter of 40 mm as the polyester (D), and an adhesive polyolefin resin, Novatec-AP196T (trade name, produced by Mitsubishi Kasei Corporation) was charged into an extruder No. 3 having a diameter of 40 mm. These components were simultaneously extruded at a die temperature of 280° C. and formed into a film at a chill roll temperature of 30° C. and a draw-off speed of 20 m/min to produce a three-type five-layered film of 170 μm in thickness which is composed of: outer layer (polypropylene composition)/adhesive layer (adhesive resin)/intermediate layer (PET)/adhesive layer (adhesive resin)/inner layer (polypropylene composition). The thickness ratio of the layers of each film is shown in Table 2.

The film obtained was stretched in the machine direction (MD) by rolls and in the transverse direction (TD) by a tenter by a stretch ratio shown in Table 2 at a preheating temperature of 90° C. and was heat-set at a heat-setting temperature of 120° C. so as to produce a stretched multi-layer film of 10 μm in thickness.

The transparency, heat-resistant temperature, percentage of shrinkage, cuttability and adhesion strength were measured. The results are shown in Table 3.

The physical properties of the films in Comparative Examples 2 and 5 could not be evaluated, respectively, because stripes were produced due to the addition of excess polyglycerin fatty acid ester (C) in Comparative Example 2, and because a rupture was caused during the stretching process, which made sampling impossible, in Comparative Example 5.

The cuttability of the films in Comparative Examples 6 and 8 were evaluated to be "slightly bad" and "bad", respectively, because the films extended slightly and were difficult to cut.

TABLE 2

| | Composition of PP layer (parts by weight) | | | Thickness ratio of layers | Stretch ratio |
|---|---|---|---|---|---|
| | (A) | (B) | (C) | (PP/Ad/PET/Ad/PP) | (MD/TD) |
| Example | | | | | |
| 1 | 100 | 12 | 1 | 3/1/2/1/3 | 4/4 |
| 2 | 100 | 12 | 2 | 3/1/2/1/3 | 4/4 |
| 3 | 100 | 14 | 1 | 3/1/2/1/3 | 4/4 |
| 4 | 100 | 12 | 2 | 3/1/2/1/3 | 3.5/1 |
| Comparative Example | | | | | |
| 1 | 100 | 12 | 0 | 3/1/2/1/3 | 4/4 |
| 2 | 100 | 12 | 6 | 3/1/2/1/3 | 1/1 |
| 3 | 100 | 2 | 2 | 3/1/2/1/3 | 4/4 |
| 4 | 100 | 35 | 2 | 3/1/2/1/3 | 4/4 |
| 5 | 100 | 12 | 2 | 3/1/2/1/3 | 7/7 |
| 6 | 100 | 12 | 2 | 3/1/2/1/3 | 1.7/1.7 |
| 7 | 100 | 12 | 2 | 3/1/2/1/5 | 4/4 |
| 8 | 100 | 12 | 2 | 3/1/2/1/3 | 1.7/4 |

TABLE 3

| | Haze (%) | Heat-resistant temp. (°C.) | Percentage of heat-shrinkage MD/TD (%) | Cuttability | Adhesion strength | | Tensile break elongation | | |
|---|---|---|---|---|---|---|---|---|---|
| | | | | | Shear peeling (kg/cm$^2$) | 180° peeling (g/50 mm) | MD (%) | TD (%) | Ratio (MD/TD) |
| Example | | | | | | | | | |
| 1 | 0.6 | 230 | 2/0 | Good | 0.52 | 1.5 | 125 | 77 | 1.6 |
| 2 | 0.3 | 230 | 2/0 | Good | 0.56 | 1.7 | 128 | 80 | 1.6 |
| 3 | 0.6 | 230 | 2/0 | Good | 0.93 | 2.1 | 125 | 80 | 1.6 |
| 4 | 0.6 | 230 | 3/−1 | Good | 0.50 | 1.7 | 71 | 410 | 0.2 |
| Comparative Example | | | | | | | | | |
| 1 | 0.7 | 230 | 2/0 | Good | 0.33 | 1.2 | 126 | 78 | 1.6 |
| 2 | — | — | — | — | — | — | — | — | — |
| 3 | 0.8 | 230 | 2/0 | Good | 0.15 | 0.91 | 130 | 80 | 1.6 |
| 4 | 0.4 | 230 | 2/0 | Good | 2.9 | 5.0 | 127 | 81 | 1.6 |
| 5 | — | — | — | — | — | — | — | — | — |
| 6 | 2.0 | 230 | 2/0 | Slightly bad | 0.54 | 1.8 | 161 | 108 | 1.5 |
| 7 | 0.7 | 170 | 23/19 | Good | 0.60 | 1.8 | 152 | 53 | 2.9 |
| 8 | 0.4 | 230 | 0/1 | Bad | 0.55 | 1.5 | 153 | 72 | 2.1 |

What is claimed is:

1. A stretched, laminated film consisting essentially of an outer layer, an intermediate layer and an inner layer, said outer layer and inner layer comprising a polypropylene resin composition composed of 100 parts by weight of a propylene polymer (A), 2 to 30 parts by weight of polybutene or polyisobutylene or both (B), and 0.2 to 5 parts by weight of a polyglycerin fatty acid ester (C); and said intermediate layer consisting essentially of a thermoplastic polyester (D), said thermoplastic polyester (D) being polyethylene terephthalate in which not more than 20 wt % of the terephthalic acid component may be replaced by another acid component and not more than 20 wt % of the ethylene glycol component may be replaced by another glycol component;

said laminated film having a shear peel strength of said outer layer and said inner layer of not less than 0.4 kg/cm$^2$, and the 180° peel strength thereof of not more than 4 g/50 mm, a tensile break elongation in the machine direction of nor more than 200%, a ratio of the tensile break elongation in the machine direction and that in the transverse direction of not more than 3, and a total film thickness of not more than 40 μm of which the thickness of said intermediate layer is 10 to 90% of the total film thickness.

2. A stretched, laminated film according to claim 1, wherein said propylene polymer is a propolymer homopolymer or a propylene copolymer.

3. A stretched, laminated film according to claim 1, wherein said propylene polymer (A) has a melt flow rate of 0.5 to 20 g/10 min and a density of 0.89 to 0.91 g/cm$^3$.

4. A stretched, laminated film according to claim 1, wherein said polybutene and/or polyisobutylene (B) has a number-average molecular weight of 200 to 3,000 and a viscosity of 300 to 50,000 cps.

5. A stretched, laminated film according to claim 1, wherein said polyglycerin fatty acid ester (C) is a compound obtained by esterifying at least one hydroxyl group of a glycerin condensation with a higher fatty acid having 8 to 22 carbon atoms.

6. A stretched, laminated film according to claim 1, wherein said thermoplastic polyester (D) is a saturated polyester produced from terephthalic acid or a derivative thereof and ethylene glycol.

7. A stretched, laminated film according to claim 1, further comprising a modified polyolefin-containing adhesive layer between said intermediated layer and said outer layer and between said intermediate layer and said inner layer.

8. A stretched, laminated film according to claim 1, wherein said film is a coextruded, laminated film.

9. A stretched, laminated film according to claim 1, wherein said film is obtained by biaxially stretching an unstretched laminated film in the machine direction and in the transverse direction.

10. A stretched, laminated film according to claim 1, wherein said film is obtained by uniaxially stretching an unstretched laminated film in the machine direction.

* * * * *